US012729320B2

(12) United States Patent
Yamamoto et al.

(10) Patent No.: US 12,729,320 B2
(45) Date of Patent: Sep. 8, 2026

(54) ANTI-REFLECTION SUBSTRATE

(71) Applicant: MITSUBISHI GAS CHEMICAL COMPANY, INC., Tokyo (JP)

(72) Inventors: Yoshiaki Yamamoto, Saitama (JP); Shota Wakayama, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 712 days.

(21) Appl. No.: 18/009,106

(22) PCT Filed: May 31, 2021

(86) PCT No.: PCT/JP2021/020584
§ 371 (c)(1),
(2) Date: Dec. 8, 2022

(87) PCT Pub. No.: WO2021/256229
PCT Pub. Date: Dec. 23, 2021

(65) Prior Publication Data

US 2023/0312973 A1 Oct. 5, 2023

(30) Foreign Application Priority Data

Jun. 17, 2020 (JP) ................................ 2020-104394

(51) Int. Cl.
*C09D 151/08* (2006.01)
*B32B 27/08* (2006.01)
*B32B 27/28* (2006.01)
*B32B 27/36* (2006.01)
*C09D 175/06* (2006.01)
*G02B 1/111* (2015.01)
*G02B 1/14* (2015.01)

(52) U.S. Cl.
CPC ......... *C09D 151/08* (2013.01); *C09D 175/06* (2013.01); *G02B 1/111* (2013.01); *B32B 27/08* (2013.01); *B32B 27/285* (2013.01); *B32B 27/36* (2013.01); *B32B 27/365* (2013.01); *B32B 2250/24* (2013.01); *B32B 2255/10* (2013.01); *B32B 2255/20* (2013.01); *B32B 2255/205* (2013.01); *B32B 2255/26* (2013.01); *B32B 2307/408* (2013.01); *G02B 1/14* (2015.01)

(58) Field of Classification Search
CPC .......... G02B 1/111; G02B 1/14; G02B 5/003; G02B 1/11–118; B32B 2250/24; G02F 1/133502; G02F 2201/38
See application file for complete search history.

(56) References Cited

U.S. PATENT DOCUMENTS

2005/0175796 A1* 8/2005 Nakamura ........... G02B 5/3033 428/32.8
2006/0269731 A1 11/2006 Yoshikaw et al.
2008/0302981 A1* 12/2008 Matsumura ............. B32B 15/00 250/515.1
2012/0069442 A1* 3/2012 Serrano ............. B29D 11/0073 359/581
2013/0258479 A1* 10/2013 Okafuji ................. C09D 5/006 156/247
2018/0231687 A1 8/2018 Byun et al.
2019/0025467 A1 1/2019 Byun et al.
2019/0137658 A1 5/2019 Song et al.
2019/0137659 A1 5/2019 Song et al.
2019/0227195 A1 7/2019 Horio et al.
2020/0278478 A1 9/2020 Byun et al.
2020/0278479 A1 9/2020 Byun et al.
2021/0053330 A1 2/2021 Kakeya et al.
2023/0168422 A1* 6/2023 Takeda .................. G02B 1/116 359/485.05

FOREIGN PATENT DOCUMENTS

JP 9-73001 A 3/1997
JP 10-96801 A 4/1998
JP H1096801 A * 4/1998
JP 2002-82205 A 3/2002
JP 2002-341107 A 11/2002
JP 2005181544 A * 7/2005 ....... B32B 17/10018
JP 2008-70459 A 3/2008
JP 2009-204698 A 9/2009
JP 2012189754 A * 10/2012
JP 2013-181039 A 9/2013
JP 2018-8431 A 1/2018
JP 2018-533762 A 11/2018
(Continued)

OTHER PUBLICATIONS

International Search Report issued in International Patent Application No. PCT/JP2021/020584, dated Jul. 27, 2021, along with and English translation thereof.
Written Opinion of the International Searching Authority in International Patent Application No. PCT/JP2021/020584 dated Jul. 27, 2921 with English translation thereof.
Extended European Search Report dated Oct. 24, 2023 issued in corresponding European family member patent application No. 21825445.6.

*Primary Examiner* — Thomas K Pham
*Assistant Examiner* — Ruby L Kauffman
(74) *Attorney, Agent, or Firm* — GREENBLUM & BERNSTEIN, P.L.C.

(57) ABSTRACT

Provided is an antireflection substrate formed by laminating the following layers (A), (B), (C) and (D) in this order: a substrate layer (A), a hard coating layer (B), a light absorbing layer (C), and a low refractive index layer (D), formed by curing a low refractive index resin composition containing an active energy ray-curable resin, hollow silica and a fluorine compound by an active energy ray, where the film thickness of the light absorbing layer (C) is 1 to 20 nm.

4 Claims, No Drawings

(56) References Cited

FOREIGN PATENT DOCUMENTS

| | | | |
|---|---|---|---|
| JP | 2019-35969 | A | 3/2019 |
| WO | 2019/163829 | A1 | 8/2019 |

* cited by examiner

ANTI-REFLECTION SUBSTRATE

TECHNICAL FIELD

The present invention relates to an antireflection substrate, and particularly, to an antireflection substrate having low luminous reflectance and excellent antifouling property.

BACKGROUND ART

In the intended use of displays for smart phones, car navigations, game machines and the like, materials having antireflection function haven been used to prevent reflection of outside light.

In general, the technique of optical interference has been used in antireflection materials. In the optical interference, an optical thin film having a film thickness that is thinner than the wavelength of a visible light is generally used. In particular, in order to realize ultra-low reflection with a luminous reflectance of 1.0% or less, it is necessary to coat the optical thin film with multiple layers. For example, an antireflective film, in which 4 layers such as $Nb_2O_5$—$SiO_2$—$Nb_2O_5$—$SiO_2$ are formed on an adhesion layer, has been known (Patent Documents 1 and 2). However, since a large number of film-forming devices are necessary for forming such a multi-layered film, the multi-layered antireflective film is problematic in terms of high costs. In addition, since the antireflective film used for displays is required to have antifouling function, it is necessary to establish an antifouling layer on an outermost layer of the antireflective film.

Meanwhile, as a method of decreasing luminous reflectance while reducing the number of films, a method of using a light absorbing layer has been known (Patent Documents 3 and 4). As such a light absorbing layer, titanium nitride, zirconium nitride, gold, silver, copper or the like can be used, and it is desired to use materials, in which the refractive index n has negative wavelength dispersion, whereas the extinction coefficient k has positive wavelength dispersion. By forming a film having a low refractive index, such as $SiO_2$, on such a light absorbing layer, low luminous reflectance can be realized even with two-layer coating. However, even by this method, in order to use the antireflective film in displays, it needs to have antifouling function, and thus, it is necessary to establish an antifouling layer on the outermost layer thereof.

As a method of establishing an antifouling layer on a light absorbing layer, a method of applying organic silane and fluorine onto a light absorbing layer has been known (Patent Document 5). This method is problematic in that it is a thermosetting method having low productivity, and in that heating is performed for a long period of time in order to stably exhibit physical properties.

In order to improve antireflection performance, the low refractive index layer desirably has a low refractive index. However, $SiO_2$ as a generally usable material has a high refractive index that is 1.46, and thus, it is difficult for $SiO_2$ to exhibit sufficient antireflection performance.

CITATION LIST

Patent Document

Patent Document 1: Patent Publication (Kokai) No. 2019-35969 A

Patent Document 2: Patent Publication (Kokai) No. 2018-8431 A

Patent Document 3: Patent Publication (Kokai) No. H10-96801 A (1998)

Patent Document 4: Patent Publication (Kokai) No. H9-73001 A (1997)

Patent Document 5: Patent Publication (Kokai) No. 2002-341107 A

SUMMARY OF INVENTION

Technical Problem

It is an object of the present invention to provide an antireflection substrate that realizes low luminous reflectance and antifouling property, by a few steps and a small number of layers.

Solution to Problem

The present inventors have conducted intensive studies directed towards achieving the aforementioned object, and as a result, the inventors have found that the aforementioned object can be achieved by the present invention as described below. Specifically, the present invention is as follows.

<1> An antireflection substrate formed by laminating the following layers (A), (B), (C) and (D) in this order:
a substrate layer (A),
a hard coating layer (B),
a light absorbing layer (C), and
a low refractive index layer (D), formed by curing a low refractive index resin composition containing an active energy ray-curable resin, hollow silica and a fluorine compound by an active energy ray, wherein
the film thickness of the light absorbing layer (C) is 1 to 20 nm.

<2> The antireflection substrate according to the above <1>, wherein the light absorbing layer (C) is formed from at least one selected from the group consisting of titanium nitride, titanium oxynitride, zirconium nitride, gold, silver, and copper.

<3> The antireflection substrate according to the above <1> or <2>, wherein the film thickness of the light absorbing layer (C) is 2 to 15 nm.

<4> The antireflection substrate according to any one of the above <1> to <3>, wherein the active energy ray-curable resin in the low refractive index layer (D) contains a urethane (meth)acrylate component.

<5> The antireflection substrate according to any one of the above <1> to <4>, wherein the fluorine compound in the low refractive index layer (D) has a perfluoropolyether bond.

<6> The antireflection substrate according to any one of the above <1> to <5>, wherein the refractive index of the low refractive index layer (D) at a wavelength of 550 nm is 1.45 or less.

<7> The antireflection substrate according to any one of the above <1> to <6>, which has a luminous reflectance of 1.0% or less.

<8> The antireflection substrate according to any one of the above <1> to <7>, which does not comprise an antifouling layer.

Advantageous Effects of Invention

By using the technique of the present invention, it becomes possible to produce an antireflection substrate having antifouling property, without newly performing antifouling coating. The antireflection substrate of the present invention is advantageous in that it has low luminous reflectance.

DESCRIPTION OF EMBODIMENTS

Hereinafter, the present invention will be described in detail by exemplifying production examples, examples, etc. However, the present invention is not limited to production examples, examples, etc. as exemplified below, and the present invention can be carried out by changing them to any given methods, unless it is largely deviated from the spirit of the present invention.

[Substrate Layer]

In the present invention, the material that constitutes the substrate layer is not particularly limited, and it is possible to use a glass substrate, a metal substrate, or a plastic substrate. In particular, such a plastic substrate is constituted with various types of compounds, and is used in various fields.

The plastic substrate preferably comprises a thermoplastic resin. The type of the thermoplastic resin is not particularly limited, and examples of the thermoplastic resin may include: acrylic resins such as a polycarbonate (PC) resin and polymethyl methacrylate (PMMA); and polyethylene terephthalate (PET), triacetyl cellulose (TAC), polyethylene naphthalate (PEN), polyimide (PI), a cycloolefin copolymer (COC), a norbornene-containing resin, polyether sulfone, cellophane, and aromatic polyamide.

The polycarbonate resin comprised in the substrate layer is not particularly limited, as long as the polycarbonate resin comprises an —[O—R—OCO]— unit containing a carbonate ester bond in the molecular backbone thereof (wherein R includes an aliphatic group, an aromatic group, or both an aliphatic group and an aromatic group, and further has a linear structure or a branched structure). A polycarbonate having a bisphenol skeleton, etc. is preferable, and a polycarbonate having a bisphenol A skeleton or a bisphenol C skeleton is particularly preferable. As such a polycarbonate resin, a mixture or a copolymer of bisphenol A and bisphenol C may be used. By using a bisphenol C-based polycarbonate resin, for example, by using a polycarbonate resin only consisting of bisphenol C, or a polycarbonate resin comprising a mixture or a copolymer of bisphenol C and bisphenol A, the hardness of the hardness of the substrate layer can be improved.

Moreover, the viscosity-average molecular weight of the polycarbonate resin is preferably 15,000 to 40,000, more preferably 20,000 to 35,000, and further preferably 22,500 to 25,000.

The acrylic resin comprised in the substrate layer is not particularly limited. Examples of the acrylic resin may include: homopolymers of various types of (meth)acrylic acid esters, typically including polymethyl methacrylate (PMMA) and methyl methacrylate (MMA); copolymers of PMMA or MMA and other one or more types of monomers; and mixtures of multiple types of those resins. Among these, (meth)acrylate comprising a cyclic alkyl structure, which is excellent in terms of low birefringence, low hygroscopicity and heat resistance, is preferable. Examples of the product of the aforementioned (meth)acrylic resin may include ACRYPET (manufactured by Mitsubishi Rayon Co., Ltd.), DELPET (manufactured by Asahi Kasei Chemicals Corporation), and PARAPET (manufactured by KURARAY CO., LTD.), but the examples are not limited thereto.

It is also possible to use a double-layer product comprising a polycarbonate resin and the aforementioned acrylic resin. By using such a double-layer product comprising a polycarbonate resin and the aforementioned acrylic resin, it is possible to maintain the thermoformability of the substrate layer, while improving the surface hardness.

In addition, the substrate layer may also comprise additives as components other than the thermoplastic resin. The additive may be, for example, at least one type of additive selected from the group consisting of a heat stabilizer, an antioxidant, a flame retardant, a flame retardant aid, an ultraviolet absorber, a release agent, and a coloring agent. Moreover, an antistatic agent, a fluorescent brightener, an antifogging agent, a flow improver, a plasticizer, a dispersant, an antibacterial agent, etc. may also be added to the substrate layer.

[Hard Coating Layer]

In the present invention, a hard coating layer is established on the substrate layer. For example, a layer formed by hard-coating on a thermoplastic resin that constitutes the substrate layer can be used. Examples of a method of forming a hard coating layer that can be applied herein may include: a method comprising applying a hard coating composition containing an active energy ray-curable resin onto the substrate layer, then drying it, and then curing the dried layer by an active energy ray; and a method comprising applying a thermosetting composition comprising a thermosetting compound onto the substrate layer, then drying it, and then heating it. Among these methods, a method comprising applying a hard coating composition containing an active energy ray-curable resin onto the substrate layer, then drying it, and then curing the dried layer by an active energy ray is desirable.

As an active energy ray-curable resin, any compound can be used, as long as it is a compound possessing a functional group having an active energy ray-curing property. A compound containing a urethane (meth)acrylate component is desirable. The urethane (meth)acrylate includes a resin material polymer comprising urethane (meth)acrylate derived from polyol, isocyanate and (meth)acrylate, and (meth)acrylate. That is to say, the urethane (meth)acrylate is preferably a mixture of urethane (meth)acrylate obtained by the dehydration condensation reaction of 3 components, namely, polyol, isocyanate and (meth)acrylate, and (meth)acrylate.

To the hard coating composition, additives can be added in order to improve physical properties. For example, fluorine-based additives or silicone-based additives that are capable of imparting an antifouling property or slipperiness, inorganic particle components for the improvement of abrasion resistance, and the like are used.

[Light Absorbing Layer]

In the present invention, a light absorbing layer is established on the hard coating layer. Examples of the material constituting the light absorbing layer that can be used herein may include: metals such as gold, silver, copper, nickel, chromium, tin, and palladium, and the alloys thereof; metal nitrides such as titanium nitride, zirconium nitride, hafnium nitride, silicon nitride, aluminum nitride, and titanium oxynitride; and metal oxides such as iron oxide, chromium oxide, and nickel oxide. Among these, it is desirable to use at least one selected from the group consisting of titanium nitride, titanium oxynitride, zirconium nitride, gold, silver, and copper. By using these materials, it becomes possible to realize low luminous reflectance over a wide wavelength range.

The light absorbing layer is preferably formed according to dry film formation. As a dry film formation method, CVD or PVD has been used. In general, PVD has been used. As PVD methods, in general, vapor deposition and sputtering have been widely used. Devices used for vapor deposition and sputtering are commercially available from a large number of device manufacturers such as ULVAC, SHINCRON, and OPTORUN.

The film thickness of the light absorbing layer is preferably 1 to 40 nm, more preferably 1 to 20 nm, further preferably 2 to 20 nm, still further preferably 2 to 15 nm, and particularly preferably 3 to 10 nm. If the thickness is too thin, it decreases the reflectance-reducing effect. In contrast, if the thickness is too thick, it may cause a significant reduction in transmittance. In the present invention, as a method of measuring the film thickness of the light absorbing layer, the method described in Examples later can be adopted.

It is also possible to establish an adhesion layer between the light absorbing layer and the hard coating layer. As such an adhesion layer, for example, $SiO_2$, $SiO_x$, $SiN_x$, $Al_2O_3$, $AiO_x$, $AlN_x$ or the like is established. Such an adhesion layer is formed according to dry film formation, and vapor deposition or sputtering is generally used.

The film thickness of the adhesion layer is preferably 1 to 10 nm, and more preferably 2 to 5 nm. If the adhesion layer is too thin, the adhesion effect may decrease. In contrast, if the adhesion layer is too thick, it may influence on optical performance.

[Low Refractive Index Layer]

In the present invention, a low refractive index layer is established on the light absorbing layer. The low refractive index layer of the present invention is formed by curing a low refractive index resin composition containing an active energy ray-curable resin, hollow silica and a fluorine compound by an active energy ray. In the present invention, the low refractive index resin composition preferably comprises a silicone-based compound or a photopolymerization initiator, in addition to the active energy ray-curable resin, the hollow silica, and the fluorine compound.

Any active energy ray-curable resin can be used, as long as it is a compound that possesses a functional group having an active energy ray-curing property. An active energy ray-curable resin containing a urethane (meth)acrylate component is desirable. The urethane (meth)acrylate includes a resin material polymer comprising urethane (meth)acrylate derived from polyol, isocyanate and (meth)acrylate, and (meth)acrylate. That is to say, the urethane (meth)acrylate is preferably a mixture of urethane (meth)acrylate obtained by the dehydration condensation reaction of 3 components, namely, polyol, isocyanate and (meth)acrylate, and (meth) acrylate.

The hollow silica is characterized in that the inside of the silica is air and the refractive index is low. As such hollow silica, for example, Throughria (product name) manufactured by JGC Catalysts and Chemicals Ltd. is commercially available, but the example of the hollow silica is not limited thereto.

Regarding the hollow silica, the active energy ray-curable resin is mixed with the hollow silica, preferably at a ratio of active energy ray-curable resin/hollow silica=90/10 to 10/90 (% by mass), and more preferably at a ratio of 80/20 to 20/80 (% by mass). If the content of the hollow silica is too high, abrasion resistance may decrease. In contrast, if the content of the hollow silica is too low, the refractive index may increase, and sufficient antireflection performance may not be obtained.

A fluorine compound having a perfluoropolyether bond is preferably used herein. As such a fluorine compound, a synthetic product can be used, but a commercially available product can be easily obtained. Examples of the commercially available fluorine compound that can be used herein may include MEGAFACE RS Series manufactured by DIC, KY Series manufactured by Shin-Etsu Chemical Co., Ltd., and OPTOOL Series manufactured by DAIKIN INDUSTRIES, LTD.

The content of the fluorine compound is preferably 1% to 30% by mass, and more preferably 5% to 20% by mass, in the mass of the low refractive index resin composition.

A silicone-based compound having a polyalkylsiloxane bond is preferably used. As such a silicone-based compound, a synthetic product can be used, but a commercially available product can be easily obtained. Examples of the commercially available silicone-based compound that can be used herein may include KP Series manufactured by Shin-Etsu Silicones, BYK Series manufactured by BYK JAPAN K.K., and TEGO Glide Series manufactured by EVONIK.

It is also possible to mix the fluorine compound with the silicone-based compound and use them as a mixture.

Moreover, the low refractive index resin composition has an active energy ray-curing property, more preferably, an ultraviolet curing property. Accordingly, the low refractive index resin composition preferably comprises a photopolymerization initiator. Examples of the photopolymerization initiator that is preferably used herein may include Omnirad 184 manufactured by IGM Resins B.V. (former IRGACURE 184 manufactured by BASF) (1-hydroxy-cyclohexyl-phenyl-ketone), Omnirad 1173 (former IRGACURE 1173) (2-hydroxy-2-methyl-1-phenyl-propan-1-one), Omnirad TPO H (former IRGACURE TPO) (2,4,6-trimethylbenzoyl-diphenyl-phosphine oxide), Omnirad 819 (former IRGACURE 819) (bis(2,4,6-trimethylbenzoyl)-phenylphosphine oxide), and EsacureONE manufactured by Lamberti (oligo (2-hydroxy-2-methyl-1-[4-(1-methylvinyl)phenyl]propane.

A mixture of an active energy ray-curable resin, hollow silica, and a fluorine compound (and further comprising a preferably added silicone-based compound and a preferably added photopolymerization initiator) is generally diluted with an organic solvent and is then used. Examples of the organic solvent may include toluene, xylene, ethyl acetate, propyl acetate, butyl acetate, methyl cellosolve, ethyl cellosolve, ethyl cellosolve acetate, propylene glycol monomethyl ether acetate, methyl alcohol, ethyl alcohol, isopropyl alcohol, butyl alcohol, diacetone alcohol, acetone, methyl ethyl ketone, methyl isobutyl ketone, cyclohexanone, hexane, heptane, octane, decane, dodecane, propylene glycol monomethyl ether, and 3-methoxybutanol.

The organic solvent is used, so that the solid content in the low refractive index resin composition becomes preferably 0.5% to 10% by mass, and more preferably 1% to 5% by mass. If the amount of the organic solvent used is too large, it becomes difficult to control the film thickness. In contrast, if the amount of the organic solvent used is too small, it may cause deterioration of the appearance.

For example, a mixture of an active energy ray-curable resin, hollow silica, a fluorine compound and a photopolymerization initiator is diluted with an organic solvent, the mixture is then coated by a predetermined method, the solvent is then dried, and the resultant is then cured by an active energy ray, so that a low refractive index layer can be formed. Since the fluorine compound having a small surface free energy comes out to the surface layer, it becomes possible to express antifouling function without particularly forming an antifouling layer.

Coating can be carried out herein according to a general method. Coating can be carried out using a bar coater, a spin coater, a gravure coater, a comma coater, a die coater, etc.

The low refractive index resin composition is diluted with an organic solvent, it is coated and dried, and it is then cured by an active energy ray, so that a low refractive index layer can be formed. As such an active energy ray, an ultraviolet light, a near-ultraviolet light, a visible light, etc. can be used. Among these, an ultraviolet light is most commonly used.

The refractive index of the low refractive index layer at 550 nm is preferably 1.45 or less, more preferably 1.42 or less, and further preferably 1.40 or less. As the refractive index decreases, antireflection performance is improved. In addition, as the refractive index decreases, it becomes possible to reduce the thickness of the light absorbing layer, and transmittance is thereby improved. In the present invention, as a method of measuring the refractive index, the method described in Examples later can be adopted.

The luminous reflectance of the antireflection substrate of the present invention is preferably 1.0% or less, more preferably 0.9% or less, and particularly preferably 0.8% or less. If the luminous reflectance is 1.0% or less, the effect of improving visibility is favorable, and is thus preferable. In the present invention, as a method of measuring the luminous reflectance, the method described in Examples later can be adopted.

The transmittance of the antireflection substrate of the present invention is preferably 50% or more, and more preferably 70% or more. If the transmittance is within the above-described range, the appearance is favorable, and is thus preferable. In the present invention, as a method of measuring the transmittance, the method described in Examples later can be adopted.

EXAMPLES

Hereinafter, the present invention will be more specifically described in the following examples. However, the present invention is not limited to the following examples, and can be arbitrarily modified and carried out within a range that is not deviated from the spirit of the present invention.

<Reflectance (Luminous Reflectance)>

Reflectance was measured in accordance with JIS Z 8722-2009, using SD6000 manufactured by NIPPON DENSHOKU INDUSTRIES Co., Ltd. Regarding the measurement of reflectance, in order to prevent reflection from the back of the film of each example (i.e. the substrate layer side), the surface opposite to the coated surface was treated with a black spray, and the reflectance was then measured. Specifically, the reflectance was measured according to an SCI system of measuring both a regular reflection light and a diffuse reflection light under the light source of D65 that is a standard light source defined by Commission Internationale de l'Eclairage (CIE). Using the thus measured reflectance, luminous reflectance that is a reflex stimulus value Y stipulated in JIS Z 8701 was calculated.

<Transmittance>

Using Spectrophotometer U-4100 manufactured by Hitachi High-Tech Science Corporation, the transmittance to a light having a wavelength of 550 nm was measured.

<Fingerprint Wiping Test>

Oleic acid (2 l) was added dropwise as an artificial fingerprint liquid onto a test piece, and was then spread out with a silicon pad. Thereafter, a cloth was placed on it, and then, was completely passed above the artificial fingerprint liquid. This operation was repeatedly carried out, and the test piece from which the fingerprint was wiped off by 5 or less times of the operations was evaluated to be o, whereas the test piece from which the fingerprint was wiped off by 6 or more times of the operations was evaluated to be x.

<Haze>

Using Hazemeter (product name: HM-150) manufactured by MURAKAMI COLOR RESEARCH LABORATORY CO., LTD., haze (%) was measured in accordance with JIS-K-7136.

<Film Thickness of Light Absorbing Layer>

For the measurement of the film thickness of the light absorbing layer, a contact-type step gauge (DektakXT manufactured by Bruker) was used. A partially masked glass substrate was equipped for every film formation of a light absorbing layer, and the step between the masked film non-formed portion and the film formed portion was measured, and the obtained value was defined as a film thickness. Besides, when the film thickness of a light absorbing layer with respect to an antireflection substrate after the formation of many layers, a method of measuring a film thickness by observing the cross section of a focused ion beam-processed film with a transmission electron microscope can be adopted.

In Examples 1 to 5 and Comparative Examples 1 to 3, there was used, as a substrate, a hard coated film (product name: MRF08U (manufactured by MITSUBISHI GAS CHEMICAL COMPANY, INC.)) formed by performing a hard coating treatment on the PMMA side of a bilayer film consisting of polycarbonate (PC) and polymethyl methacrylate (PMMA), using the after-mentioned urethane acrylate-based hard coating composition (B-1). In Example 6, there was used, as a substrate, a hard coated film formed by performing the same hard coating treatment using urethane acrylate as described above on a film consisting of polyethylene terephthalate (PET) (product name: COSMOSHINE A4100 (manufactured by Toyobo Co., Ltd.), thickness: 188 μm). In Example 7, there was used, as a substrate, a hard coated film formed by performing the same hard coating treatment using urethane acrylate as described above on a film consisting of triacetyl cellulose (TAC) (product name: TD80UL (manufactured by FUJIFILM Corporation), thickness: 80 μm).

Low Refractive Index Resin Composition (A-1)

In order to form a low refractive index layer, a thermosetting coating having a refractive index was prepared as follows.

First, into a five-necked flask equipped with a stirrer, a thermometer, a cooler, a monomer dropping funnel and a dry air introduction pipe, dry air had previously been introduced, so that the inside of the reaction system had been dried. Thereafter, into the five-necked flask, 58.9 parts by mass of 2,2,3,3-tetrafluoro-1,4-butanediol (C4DIOL manufactured by Exfluor Research Corporation), 279.8 parts by mass of pentaerythritol triacrylate, 0.5 parts by mass of dibutyltin laurate used as a polymerization catalyst, and 500 parts by mass of methyl ethyl ketone used as a solvent were added, and the obtained mixture was then heated to 60° C. Thereafter, 161.3 parts by mass of isophorone diisocyanate was added to the reaction mixture, and the thus obtained mixture was then reacted at 60° C. to 70° C. It was confirmed by infrared spectroscopy that isocyanate residues in the reaction product were consumed, and the reaction was then terminated to obtain a hexafunctional urethane acrylate oligomer.

Furthermore, 2-(2-vinyloxyethoxy)ethyl acrylate (VEEA) was mixed into the urethane acrylate oligomer (urethane acrylate solution) at a ratio of urethane acrylate solution/VEEA=90/10 (% by mass).

To the thus obtained liquid component of a resin material, hollow silica (Throughria 4320 manufactured by JGC Catalysts and Chemicals Ltd.) were added, and they were then mixed with each other to obtain a ratio of resin material/hollow silica=50/50 (% by mass) relative to a solid content. Further, to the thus obtained low refractive coating raw materials (the resin material+the hollow silica), 5% by mass of 1-hydroxy-cyclohexyl-phenyl-ketone (I-184 manufactured by BASF) used as a photopolymerization initiator, 10% by mass of MEGAFACE RS-90 (manufactured by DIC; 10% by mass of a solid, which was diluted with the solvent MEK) used as a fluorine compound, and 10% by mass of BYK-UV3575 (a degenerated polydimethylsiloxane surfactant manufactured by BYK JAPAN K.K.) were added and were dissolved therein. After that, a solvent (propylene glycol monomethyl ether) was added thereto to adjust the concentration, so that the solid content became 1.5% by mass. It is to be noted that the mixed amount of each additive was indicated with % by mass with respect to 100% by mass of the solid content of the low refractive coating raw materials, when the solid content was set to be 100% by mass.

Hard Coating Composition (B-1)

Urethane acrylate UN-954 (manufactured by Neagari Chemical Industrial Co., Ltd.) used as a hard coat paint, 5% by mass of 1-hydroxy-cyclohexyl-phenyl-ketone (I-184 manufactured by BASF) used as a photopolymerization initiator, 1% by mass of BYK-3550 (manufactured by BYK JAPAN K.K.) used as a leveling agent, and a solvent (propylene glycol monomethyl ether) were mixed with one another, and the concentration of the mixture was adjusted, so that the solid content became 30% by mass. It is to be noted that the mixed amount of each additive was indicated with % by mass with respect to 100% by mass of the solid content of the hard coat paint, when the solid content was set to be 100% by mass.

The low refractive index resin composition (A-1) was applied onto a glass plate, and was then dried at 100° C. for 2 minutes, and a low refractive index layer was then formed by performing UV curing at a cumulative light intensity of 400 mJ/cm$^2$. The refractive index of the low refractive index layer at 550 nm was measured using a spectroscopic ellipsometer (Auto SE manufactured by HORIBA, Ltd.). As a result, the refractive index was 1.38. In addition, the refractive index of the hard coating composition (B-1) was measured by the same method as that described above. As a result, it was 1.50.

Example 1

A copper film was formed by sputtering on the surface of the aforementioned substrate (product name: MRF08U) on which a hard coating treatment had been performed, so as to obtain a film thickness of 3.0 nm, thereby forming a light absorbing layer. Subsequently, in order to achieve a film thickness of 100 nm after completion of drying and UV curing, the low refractive index resin composition (A-1) was coated onto the light absorbing layer, using a bar coater, and it was then dried at 100° C. for 2 minutes. Thereafter, UV curing was carried out at a cumulative light intensity of 400 mJ/cm$^2$ to form a low refractive index layer, so as to produce an antireflection substrate. The luminous reflectance and transmittance of the obtained antireflection substrate were measured. As a result, the luminous reflectance was 0.60%, and the transmittance was 87%. A fingerprint wiping test was carried out, and the results were o.

Example 2

A titanium nitride film was formed by sputtering on the surface of the aforementioned substrate (product name: MRF08U) on which a hard coating treatment had been performed, so as to obtain a film thickness of 6.0 nm, thereby forming a light absorbing layer. Subsequently, in order to achieve a film thickness of 100 nm after completion of drying and UV curing, the low refractive index resin composition (A-1) was coated onto the light absorbing layer, using a bar coater, and it was then dried at 100° C. for 2 minutes. Thereafter, UV curing was carried out at a cumulative light intensity of 400 mJ/cm$^2$ to form a low refractive index layer, so as to produce an antireflection substrate. The luminous reflectance and transmittance of the obtained antireflection substrate were measured. As a result, the luminous reflectance was 0.75%, and the transmittance was 80%. A fingerprint wiping test was carried out, and the results were o.

Example 3

A titanium nitride film was formed by sputtering on the surface of the aforementioned substrate (product name: MRF08U) on which a hard coating treatment had been performed, so as to obtain a film thickness of 3.6 nm, thereby forming a light absorbing layer. Subsequently, in order to achieve a film thickness of 85 nm after completion of drying and UV curing, the low refractive index resin composition (A-1) was coated onto the light absorbing layer, using a bar coater, and it was then dried at 100° C. for 2 minutes. Thereafter, UV curing was carried out at a cumulative light intensity of 400 mJ/cm$^2$ to form a low refractive index layer, so as to produce an antireflection substrate. The luminous reflectance and transmittance of the obtained antireflection substrate were measured. As a result, the luminous reflectance was 0.49%, and the transmittance was 85.6%. A fingerprint wiping test was carried out, and the results were o.

Example 4

A titanium nitride film was formed by sputtering on the surface of the aforementioned substrate (product name: MRF08U) on which a hard coating treatment had been performed, so as to obtain a film thickness of 6.4 um, thereby forming a light absorbing layer. Subsequently, in order to achieve a film thickness of 85 nm after completion of drying and UV curing, the low refractive index resin composition (A-1) was coated onto the light absorbing layer, using a bar coater, and it was then dried at 100° C. for 2 minutes. Thereafter, UV curing was carried out at a cumulative light intensity of 400 mJ/cm$^2$ to form a low refractive index layer, so as to produce an antireflection substrate. The luminous reflectance and transmittance of the obtained antireflection substrate were measured. As a result, the luminous reflectance was 0.50%, and the transmittance was 82.2%. A fingerprint wiping test was carried out, and the results were o.

Example 5

A titanium nitride film was formed by sputtering on the surface of the aforementioned substrate (product name: MRF08U) on which a hard coating treatment had been performed, so as to obtain a film thickness of 11.3 nm, thereby forming a light absorbing layer. Subsequently, in order to achieve a film thickness of 85 nm after completion of drying and UV curing, the low refractive index resin composition (A-1) was coated onto the light absorbing layer, using a bar coater, and it was then dried at 100° C. for 2 minutes. Thereafter, UV curing was carried out at a cumulative light intensity of 400 mJ/$cm^2$ to form a low refractive index layer, so as to produce an antireflection substrate. The luminous reflectance and transmittance of the obtained antireflection substrate were measured. As a result, the luminous reflectance was 0.50%, and the transmittance was 73.2%. A fingerprint wiping test was carried out, and the results were o.

Example 6

A titanium nitride film was formed by sputtering on the surface of the aforementioned PET substrate (product name: COSMOSHINE A4100) on which a hard coating treatment had been performed, so as to obtain a film thickness of 6.4 nm, thereby forming alight absorbing layer. Subsequently, in order to achieve a film thickness of 85 nm after completion of drying and UV curing, the low refractive index resin composition (A-1) was coated onto the light absorbing layer, using a bar coater, and it was then dried at 100° C. for 2 minutes. Thereafter, UV curing was carried out at a cumulative light intensity of 400 mJ/$cm^2$ to form a low refractive index layer, so as to produce an antireflection substrate. The luminous reflectance and transmittance of the obtained antireflection substrate were measured. As a result, the luminous reflectance was 0.58%, and the transmittance was 82.1%. A fingerprint wiping test was carried out, and the results were o.

Example 7

A titanium nitride film was formed by sputtering on the surface of the aforementioned TAC substrate (product name: TD80UL) on which a hard coating treatment had been performed, so as to obtain a film thickness of 6.4 nm, thereby forming a light absorbing layer. Subsequently, in order to achieve a film thickness of 85 nm after completion of drying and UV curing, the low refractive index resin composition (A-1) was coated onto the light absorbing layer, using a bar coater, and it was then dried at 100° C. for 2 minutes. Thereafter, UV curing was carried out at a cumulative light intensity of 400 mJ/$cm^2$ to form a low refractive index layer, so as to produce an antireflection substrate. The luminous reflectance and transmittance of the obtained antireflection substrate were measured. As a result, the luminous reflectance was 0.40%, and the transmittance was 82.3%. A fingerprint wiping test was carried out, and the results were o.

Comparative Example 1

A copper film was formed by sputtering on the surface of the aforementioned substrate (product name: MRF08U) on which a hard coating treatment had been performed, so as to obtain a film thickness of 4.0 nm, thereby forming a light absorbing layer. Thereafter, a $SiO_2$ film was formed by sputtering on the light absorbing layer to a film thickness of 50 nm, so as to produce an antireflection substrate. The luminous reflectance and transmittance of the obtained antireflection substrate were measured. As a result, the luminous reflectance was 0.80%, and the transmittance was 80%. A fingerprint wiping test was carried out, and the results were x.

Comparative Example 2

The low refractive index resin composition (A-1) was coated onto the surface of the aforementioned substrate (product name: MRF08U) on which a hard coating treatment had been performed, using a bar coater, so that the film thickness after completion of drying and UV curing would become 100 nm, and it was then dried at 100° C. for 2 minutes. Thereafter, UV curing was carried out at a cumulative light intensity of 400 mJ/$cm^2$ to form a low refractive index layer, so as to produce an antireflection substrate. The luminous reflectance and transmittance of the obtained antireflection substrate were measured. As a result, the luminous reflectance was 1.42%, and the transmittance was 93.6%. A fingerprint wiping test was carried out, and the results were o.

Comparative Example 3

A titanium nitride film was formed by sputtering on the surface of the aforementioned TAC substrate (product name: TD80UL) on which a hard coating treatment had been performed, so as to obtain a film thickness of 21.1 nm, thereby forming a light absorbing layer. Subsequently, in order to achieve a film thickness of 85 nm after completion of drying and UV curing, the low refractive index resin composition (A-1) was coated onto the light absorbing layer, using a bar coater, and it was then dried at 100° C. for 2 minutes. Thereafter, UV curing was carried out at a cumulative light intensity of 400 mJ/$cm^2$ to form a low refractive index layer, so as to produce an antireflection substrate. The luminous reflectance and transmittance of the obtained antireflection substrate were measured. As a result, the luminous reflectance was 14.12%, and the transmittance was 42.1%. A fingerprint wiping test was carried out, and the results were o.

The results of Examples 1 to 7 and Comparative Examples 1 to 3 are shown in the following Table 1.

TABLE 1

| | | Ex. 1 | Ex. 2 | Ex. 3 | Ex. 4 | Ex. 5 |
|---|---|---|---|---|---|---|
| Composition | Low refractive index layer | Low refractive index resin composition (A-1) | Low refractive index resin composition (A-1) | Low refractive index resin composition (A-1) | Low refractive index resin composition (A-1) | Low refractive index resin composition (A-1) |
| | Light absorbing layer | Cu | TiN | TiN | TiN | TiN |
| | Hard coating layer | Hard coating composition (B-1) | Hard coating composition (B-1) | Hard coating composition (B-1) | Hard coating composition (B-1) | Hard coating composition (B-1) |
| | Substrate | PC/PMMA | PC/PMMA | PC/PMMA | PC/PMMA | PC/PMMA |
| Film thickness | Low refractive index layer | 100 nm | 100 nm | 85 nm | 85 nm | 85 nm |
| | Light absorbing laver | 3.0 nm | 6.0 nm | 3.6 nm | 6.4 nm | 11.3 nm |

TABLE 1-continued

| | | | | | | |
|---|---|---|---|---|---|---|
| | Hard coating layer | 3.5 μm | 3.5 μm | 3.6 μm | 3.5 μm | 3.5 μm |
| | Substrate | 254 μm | 254 μm | 254 μm | 254 μm | 254 μm |
| Transmittance | Measured value % | 87.0 | 80.0 | 85.6 | 82.2 | 73.2 |
| Luminous reflectance | Measured value % | 0.60 | 0.75 | 0.49 | 0.50 | 0.50 |
| Haze | Measured value % | 0.1 | 0.1 | 0.1 | 0.1 | 0.1 |
| Fingerprint resistance | Judgement | ○ | ○ | ○ | ○ | ○ |
| Comprehensive evaluation | Judgement | ○ | ○ | ○ | ○ | ○ |

| | | Ex. 6 | Ex. 7 | Comp. Ex. 1 | Comp. Ex. 2 | Comp. Ex. 3 |
|---|---|---|---|---|---|---|
| Composition | Low refractive index layer | Low refractive index resin composition (A-1) | Low refractive index resin composition (A-1) | $SiO_2$ | Low refractive index resin composition (A-1) | Low refractive index resin composition (A-1) |
| | Light absorbing layer | TiN | TiN | Cu | — | TiN |
| | Hard coating layer | Hard coating composition (B-1) | Hard coating composition (B-1) | Hard coating composition (B-1) | Hard coating composition (B-1) | Hard coating composition (B-1) |
| | Substrate | PET | TAC | PC/PMMA | PC/PMMA | PC/PMMA |
| Film thickness | Low refractive index layer | 85 nm | 85 nm | 58 nm | 100 nm | 85 nm |
| | Light absorbing laver | 6.4 nm | 6.4 nm | 4.0 nm | — | 21.1 nm |
| | Hard coating layer | 3.5 μm | 3.5 μm | 3.5 μm | 3.5 μm | 3.5 μm |
| | Substrate | 188 μm | 80 μm | 254 μm | 254 μm | 254 μm |
| Transmittance | Measured value % | 82.1 | 82.3 | 80.0 | 93.6 | 42.1 |
| Luminous reflectance | Measured value % | 0.58 | 0.40 | 0.80 | 1.42 | 14.12 |
| Haze | Measured value % | 0.1 | 0.1 | 0.1 | 0.1 | 0.1 |
| Fingerprint resistance | Judgement | ○ | ○ | × | ○ | ○ |
| Comprehensive evaluation | Judgement | ○ | ○ | × | × | × |

The invention claimed is:

1. An antireflection substrate formed by laminating the following layers (A), (B), (C) and (D) in this order:
   - a substrate layer (A),
   - a hard coating layer (B),
   - a light absorbing layer (C), and
   - a low refractive index layer (D), formed by curing a low refractive index resin composition containing an active energy ray-curable resin, hollow silica and a fluorine compound by an active energy ray, wherein
   - a film thickness of the light absorbing layer (C) is 2 to 15 nm,
   - wherein the light absorbing layer (C) is formed by a dry film formation selected from CVD and PVD,
   - the active energy ray-curable resin in the low refractive index layer (D) contains a urethane (meth)acrylate component,
   - the fluorine compound in the low refractive index layer (D) has a perfluoropolyether bond, and
   - the light absorbing layer (C) is formed from at least one selected from the group consisting of titanium nitride, titanium oxynitride, zirconium nitride, gold, silver, and copper.

2. The antireflection substrate according to claim 1, wherein a refractive index of the low refractive index layer (D) at a wavelength of 550 nm is 1.45 or less.

3. The antireflection substrate according to claim 1, which has a luminous reflectance of 1.0% or less.

4. The antireflection substrate according to claim 1, which does not comprise an antifouling layer.

* * * * *